United States Patent [19]

Meijer et al.

[11] Patent Number: 5,074,114
[45] Date of Patent: Dec. 24, 1991

[54] CONGENERATION SYSTEM WITH A STIRLING ENGINE

[75] Inventors: Roelf J. Meijer, Ann Arbor; Ernst J. Meijer, Saline; Ted M. Godett, Ann Arbor, all of Mich.

[73] Assignee: Stirling Thermal Motors, Inc., Ann Arbor, Mich.

[21] Appl. No.: 522,588

[22] Filed: May 14, 1990

[51] Int. Cl.⁵ .......................................... F02G 1/043
[52] U.S. Cl. ........................................ 60/517; 60/685; 290/1 R
[58] Field of Search ..................... 60/517, 648, 685; 290/1 R, 1 A, 2

[56] References Cited

U.S. PATENT DOCUMENTS 3,906,728  9/1975  Kantz ................................. 60/524
4,680,478  7/1987  Wicks .

OTHER PUBLICATIONS

Popular Science, by V. Elaine Gilmore, Home-size Cogenerator, 2-6-89, pp. 2 & 3.
System and Technology Concept Evaluation . . . , W. P. Teagan, R. P. Wilson, L. Frantzis and S. Mathias, Oct. 1986, pp. 5-23-5-29.
The Philip Stirling Engine, R. J. Meijer, 1969, pp. 1-23.

Primary Examiner—Allen M. Ostrager
Attorney, Agent, or Firm—Harness, Dickey & Pierce

[57] ABSTRACT

A cogeneration system is disclosed using a Stirling cycle engine in which the waste heat from the engine and a generator driven by the engine is used for space heating or producing hot water and the generator used to produce electricity. A Stirling engine has numerous advantages over a reciprocating internal combustion engine in cogeneration systems in that the Stirling engine has a longer life, less maintenance cost, less noise and vibration and fewer emissions. With cogeneration, the added energy and fuel required over and above that required to produce a comparable amount of heat allowed to produce the same amount of heat with a conventional furnace or boiler is often less than the amount of electric energy produced from the system thereby resulting in a efficiency greater than 100% in the production of electricity.

16 Claims, 4 Drawing Sheets

CONGENERATION SYSTEM WITH A STIRLING ENGINE

BACKGROUND AND SUMMARY OF THE INVENTION

The present invention relates to a cogeneration system and more particularly to a cogeneration system employing a Stirling cycle engine for driving an electric generator wherein the "waste" heat is used to provide space heating or hot water service.

Cogeneration is a process whereby a consumer in need of either hot water and/or heat for a residence or a small business, instead of merely burning fuel to produce heat, can burn fuel to drive an electric generator and utilize the cycle heat and the waste heat from the drive means, generator and exhaust to produce the needed hot water or hot air. The electricity generated can be used on site with any surplus electric energy directed to the utility's electric grid and sold to the utility. Numerous efficiencies can be achieved with such a cogeneration system.

The second law of thermodynamics states that the quality of energy can change only in one direction, energy losses its capacity to do useful work, ultimately reaching the point of zero usefulness. As available work is consumed, the quality of energy is degraded, however, the quantity of energy remains the same. Hence, good energy saving practice strives to harness energy of the highest quality possible, that is to avoid unwanted degradation.

Following the second law of thermodynamics, it is wasteful to burn fuels just to obtain low quality energy needed for low temperature process heat such as heating a residence or a small business or producing hot water. However, by cogeneration of electricity and heat, the system efficiency can be greatly increased. By way of example, a process of producing both electricity and heat independently of one another may result in combined efficiency of only 52%. When a cogeneration approach is used, the total efficiency can increase to as high as 85%. In another example, it is possible to produce high pressure steam at a temperature of 500° C. for a back pressure turbine where it is converted to mechanical energy that drives an electric generator. The steam at the outlet of the turbine is at a temperature of 150° C. to 175° C. and can be used to fulfill many thermal needs. The efficiency of this process is greater than the efficiency of a process used to produce equal amounts of electricity and process heat independent of one another.

Between 1980 and 1983, approximately 9,000 MW of cogeneration capacity was installed in the United States. Most of these installations are over 200 kW in size. Studies project the feasibility of a total 68,000 MW more of cogeneration capacity which is the equivalent output of approximately seventy power plants. These relative large industrial and commercial cogeneration applications are being implemented in large part due to the fact that available engines can be economically utilized and the market can be met through existing engineering technology and the large, relatively steady electric loads of the industrial or commercial applications make the economics of cogeneration favorable.

However, the majority of buildings in the U.S. are residential and light commercial, with an estimated aggregate electric load of about 140,000 MW on an annual average. To date, there has been limited commercial success in developing small scale cogeneration equipment. This results from the difficulty of economically implementing such applications using currently available equipment. The difficulties are both technical and economic in nature and include the fact that small building loads are highly variable compared to industrial cogeneration applications. This is particularly true in single family homes where fluctuations from 0.1 to 0.5 kW of electric energy occur in seconds and thermal loads are weather dependent resulting in seasonal variations. These widely varying loads complicate the task of determining the design, size, and operational strategies for systems having high duty cycles and high overall electrical and heat recovery efficiency required for economical viability. Furthermore, most engines in the 1-30 kW size currently available are designed for only 500-2,000 hours of life before complete overhaul or replacement. By contrast, small scale cogeneration requires maintenance free engines with a life at least ten times longer. Most of the cost of maintenance is associated with routine servicing which, in small sizes, tends to be dominated by high labor costs.

However, there are certain advantages to small units which might overcome many of these barriers. For example, standardized modular packages could eliminate the site specific engineering and system design cost often associated with the larger applications. The potential market in number of units is much larger for small modules than for custom engineered larger systems. This could result in economics of manufacturing scale which could overcome inherent economics of size in individual components. Many applications above 30 kW might be better served by using multiples of smaller modules rather than a single larger unit in order to reduce vulnerability to increased utility demand charges since it is unlikely that more than one unit would go down at the same time, i.e. only a fraction of generating capacity will be lost with the loss of a single module.

Current small cogeneration systems of 10 to 30 kW have been tried with a reciprocating internal combustion engine without great success. Such a system has many drawbacks. These engines have a relative short life. The maintenance costs of the engines are high and time consuming. These include lubricating oil changes, spark plug changes, etc. Reciprocating internal combustion engines are noisy and also produce vibration. The engine exhaust is high in polluting emissions and half of the waste heat is in the exhaust which results in corrosion problems due to the nitrous oxides in the exhaust.

The Stirling cycle engine, however, is well suited for cogeneration applications. This is due in part to qualities of the Stirling engine such as quiet running, primary heat rejection by cooling water, long life, low emissions, and low maintenance.

Stirling engines may be powered directly by any source of heat such as from solar energy sources, combusted gases, liquid fuels, solid fuels etc. The preferred type of Stirling engine for use in small cogeneration systems incorporates multiple gas combustors that are integrated into the structure of the engine to provide a compact and efficient energy conversion machine. This system eliminates the requirement of a separate heat pipe or other heat transport systems for transferring heat from a remote source. Individual combustors are provided for each cylinder of a multiple cylinder Stirling engine.

The output shaft of the Stirling engine is coupled to an electric generator to drive the generator. In the preferred embodiment, the generator is enclosed in the pressure hull of the engine reducing the complexity of the drive shaft coupling and seals. The electric power generated is consumed on the premises with any surplus electric energy being fed to the electric grid and sold to the local utility. The engine and generator are cooled by cooling water. The water is further heated in a condensing heat exchanger by the hot engine exhaust gases. The hot water is then used for space heating or to provide hot water service to the building. For space heating, the water can be fed to hot water radiators or used to heat air for forced air space heating.

In other embodiments disclosed below, an air conditioner can be included with the cogeneration system with the electricity produced used to power the air conditioning compressor. When operating the air conditioner, since space heat is not needed, the cooling water is routed to a radiator outside of the building for rejection of waste heat from the Stirling engine and generator.

In addition to providing more efficient use of fuels, a cogeneration system also reduces $CO_2$ emissions. Coal combustion, often used for producing electric energy at a power plant, produces much more $CO_2$ than natural gas combustion that is most often burned for residential and light commercial building heating purposes. Thus, electricity produced by cogeneration will reduce the amount of $CO_2$ emissions. Furthermore, since the electricity can be used at or near its site of production, transmission line losses can be reduced. This reduces the amount of electric power which must be generated, thereby reducing the amount of fuel burned and emissions produced.

Further objects, features and advantages of the invention will become apparent from a consideration of the following description and the appended claims when taken in connection with the accompanying drawings.

DETAILED DESCRIPTION OF THE INVENTION

Figure 1:
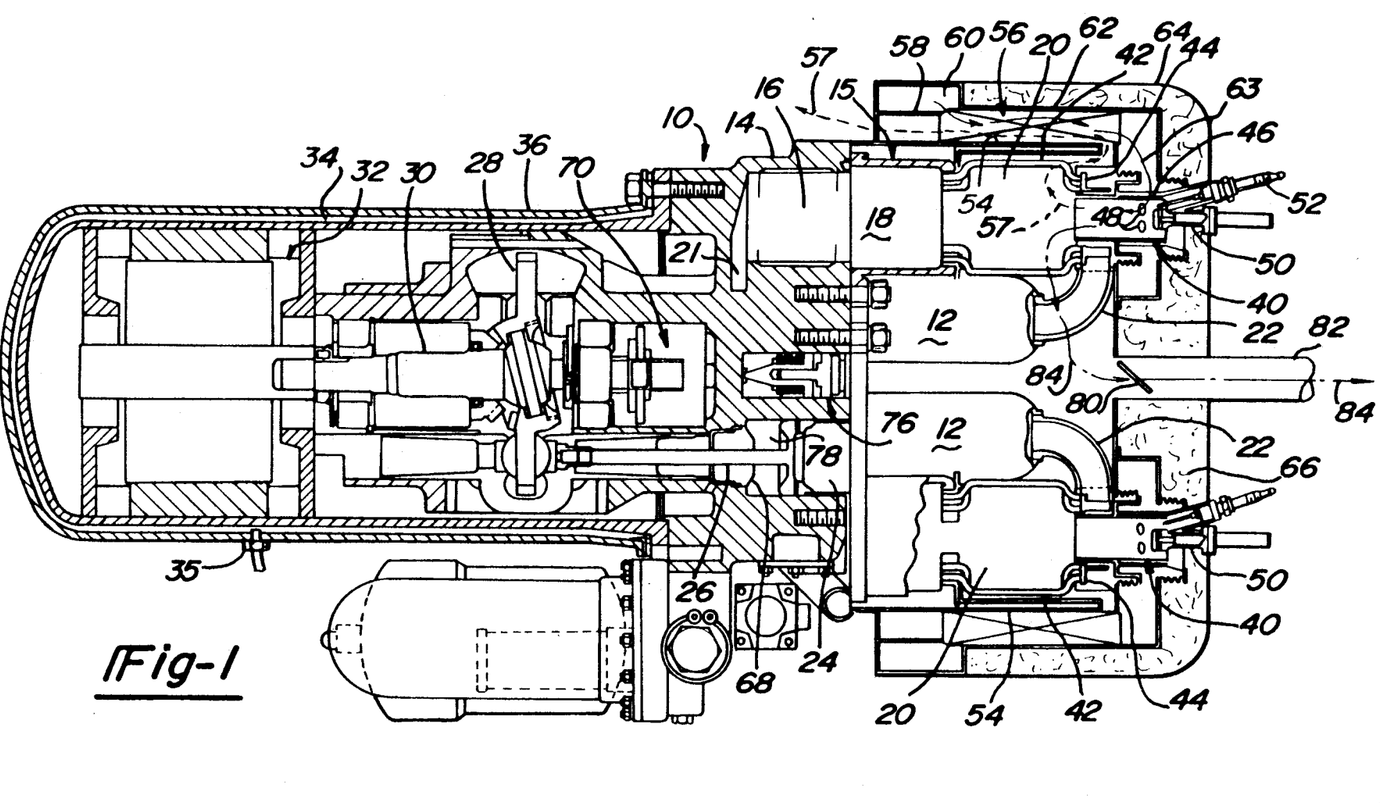
FIG. 1 is a longitudinal, partially cross sectional and partially elevational view of a Stirling engine with integrated gas combustors and an electric generator in accordance with this invention.

The Stirling cycle engine used in the cogeneration system of this invention is shown in FIG. 1 and is generally designated by reference numeral 10. Engine 10 includes four substantially parallel piston cylinders 12 which are disposed in a square cluster about a central axis within drive mechanism housing 14. Associated with each piston cylinder 12 and located on an end surface of drive mechanism housing 14 are heat transfer stacks 15 comprising cooler 16, regenerator 1B, and heat exchanger 20. Cooler 16, regenerator 18, and heat exchanger 20 are arranged end-to-end to form a cylindrical column. Each heat exchanger 20 communicates with a separate piston cylinder 12 by one of four connecting ducts 22 each connected to one end of a cylinder 12. The other end of each cylinder 12 is connected to a cooler 16 of another of the four heat stacks 15 by duct 21.

Located within each piston cylinder 12 is a movable piston 24 and a connecting rod 26 rigidly fixed thereto. Connecting rods 26 are attached to swashplate 28 to convert the reciprocating axial motion of pistons 24 to rotary motion of output shaft 30. Output shaft 30 is coupled to an electric generator 3 to drive the generator. Generator 32 is enclosed in the pressure hull 34 of the Stirling engine. Pressure hull 34 and drive mechanism housing 14 are cooled by water circulating around the pressure hull within water jacket 36.

Heat is inputted to Stirling engine 10 through separate combustor assemblies 40 associated with each of the heat exchangers 20. As shown, heat exchangers 20 are comprised of a plurality of relatively thin and flexible tubes 42 through which the working fluid, such as helium or hydrogen of Stirling engine 10 flows. The working fluid flowing through tubes 42 collects at annular manifold 44 which communicates with connecting duct 22.

Each combustor assembly 40 includes a combustion chamber tube 46 which has a plurality of air inlets 48. A combustible gas is introduced into combustion chamber tubes 46 through gas nozzles 50. Air inlets 48 and gas nozzles 50 are designed to provide a highly turbulent combustible gas flow within combustion chamber tubes 46 which provides for efficient and clean combustion. Ignition plug 52 is provided to initiate combustion.

The Stirling engine working fluid within heat exchanger 20 expands due to the heat. This increases the pressure in ducts 22 and cylinder 12 to force piston 24 toward swashplate 28. As the pistons move, they displace working fluid from coolers 16 through regenerators 18 to heat exchanger 20 in an adjacent heat transfer stack 15.

Heat exchanger wall 54 surrounds engine 10 and serves to confine hot gases from combustion chamber tubes 46 within exchangers 20. Radially outside of wall 54 are counterflow heat exchangers 56. As shown by the phantom line arrows 57, exhaust gases are permitted to flow through heat exchangers 56 and escape between walls 54 and 58. Inlet air also passes through heat exchangers 56 from air inlet 60 formed between annular walls 58 and 62 as shown by full line arrows 63. The counterflow heat exchangers 56 thus serve as a preheater to heat inlet air with the hot exhaust gases to provide enhanced thermal efficiency of engine 10. The region between wall 62 and outer housing 64 is packed with a thermal insulating material 66. From the heat exchangers 56 the exhaust gases are collected in a manifold and directed to a condensing heat exchangers where the heat is transferred to the engine cooling water. The cooled exhaust gases are then exhausted from the building in which the cogeneration system is installed. This will be described in greater detail below.

The requirements for space heating in small commercial and residential buildings are highly variable depending upon the weather and the building occupancy.

In order to more readily accommodate sudden demands for increased heat, the Stirling engine is provided with an exhaust bypass valve 80 to direct the hot combustion gases directly to the condensing heat exchanger without first preheating the intake combustion air. Bypass valve 80 is disposed in exhaust outlet 82. When valve 80 is opened, hot exhaust gases from heat exchangers 20 flow through exhaust outlet 82 as indicated by the phantom line arrows 84.

By diverting the hot combustion gases directly to the condensing heat exchanger rather than directing the gases first through the counterflow heat exchangers 56, additional heat is provided to the engine cooling water for space heating. By so doing, the incoming combustion air is at a lower temperature. In order to maintain the heat exchangers 20 at the same temperature, more fuel is required. As a result, the overall system efficiency is reduced in exchange for producing more heat. By-pass valve 80 can be regulated at any position between fully open and fully closed to regulate the heat supplied to the water depending on the heat demand.

Swashplate housing 36 contains lubricating oil for the swashplate and drive mechanism. The lubricating oil is sealed from the piston cylinders 12 by cap seal assemblies 68 at the end of the piston cylinders 12. Oil pump module 70 houses a lubrication oil pump that is directly driven by the engine shaft. Internal passages direct the oil to galleries to provide lubrication of the drive mechanism moving parts.

Stirling engine 10 is started by operating generator 32 as a motor to drive engine shaft 30. To reduce the starting torque caused by gas compression, Stirling engine 10 includes a short circuit valve assembly 76 which is used to connect the lower portions 78 of piston cylinders 12 with one another. With the cylinders connected, as pistons 24 are moved, there is no compression of the working gas. Details of short circuit valve assembly 76 are shown in the enlarged view of FIG. 2.

Figure 2:
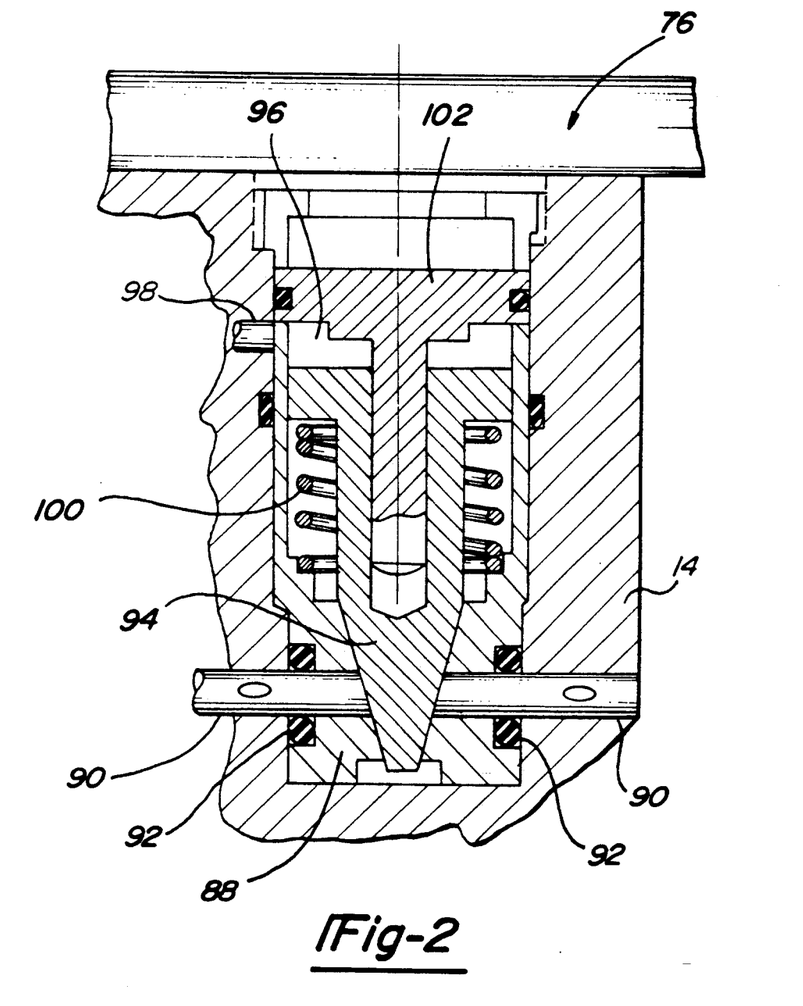
FIG. 2 is an enlarged cross sectional view of the short circuit valve assembly shown in FIG. 1.

Valve assembly 76 includes valve seat housing 88 through which passes four conduits 90 leading to lower portion 78 of each cylinder 12. The conduits 90 intersect one another at the center of valve seat housing 88. 0-ring seals 92 around conduits 90 seal the juncture of valve seat housing 88 with drive mechanism housing 14 to prevent loss of the Stirling engine working gas. Valve member 94 is shown in the seated position in which valve member 94 closes the intersection of the conduits 90 to separate each cylinder 12 from one another. After the engine has been warmed to operating temperature, valve member 94 is held in the closed position by lubricating oil in chamber 96 from oil passage 98. When the engine is turned off and the oil pressure is reduced, spring 100 moves valve member 94 against valve support 102 to open conduits 90 until the engine is started again. Spring 100 has a spring rate so that engine 10 will be heated to operating temperature when the oil pressure in chamber 96 is sufficient to close valve 76.

When engine 10 is being started, the lubricating oil pressure gradually builds up until it is sufficient to move member 94 to close conduits 90. During this time, fuel is being burned in combustors 40 to warm the engine to operating temperatures. When operating temperatures have been reached, the lubricating oil pressure forces valve member 94 downward to close conduits 90. Pistons 24 then begin to compress and displace the working fluid to operate the Stirling engine.

Coolers 16 include a plurality of cooling tubes (not shown) similar to tubes 42 in heaters 20, through which the engine working fluid passes. The cooling tubes are connected to the lower portion 78 of a cylinder 12 by ducts 21. Engine cooling water circulates through coolers 16 around pipes 43 to remove heat from the working fluid. Cooling water enters the engine and generator through fitting 35 in water jacket 36.

Figure 3:
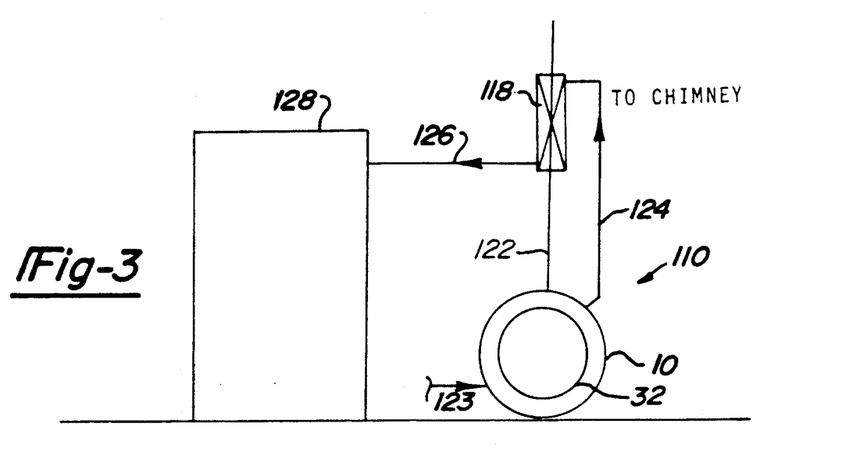
FIG. 3 is a schematic view of a hot water cogeneration system.

FIG. 3 shows a schematic of a cogeneration system 110 according to the present invention used to produce hot water. The exhaust gases from engine 10 are directed through exhaust pipe 122, condensing heat exchanger 118 and to a chimney or other outlet. The engine and generator 32 are cooled by a cooling liquid, in this case water, which enters the engine and generator through inlet 123. The water is warmed by the engine and generator and leaves the engine through pipe 124. The water is further heated in heat exchanger 118 by the engine exhaust gases. Once heated, the water flows through pipe 126 to storage tank 128 for use as hot water when needed. In cogeneration system 110, Stirling engine 10 is operated with a mean temperature of heat exchangers 20 of 800° C. The coolers 16 are maintained at a mean temperature of 80° C. The engine size is determined such that the "waste" heat from the Stirling cycle, friction, generator and exhaust is sufficient to provide the needed heat under peak conditions. A single size engine can be used in a standard cogeneration package with the engine working fluid mean pressure set at different values to vary the heat output depending on heating need.

The efficiency of cogeneration system 110 is shown by the following example. Studies indicate that a small commercial building, such as a modest restaurant, needs about 5100 gallons of hot water per day with a temperature rise of 85° F. This requires a heat input of 42 kW thermal. Calculations have been made using a Stirling engine such as engine 10 shown in FIG. 1 having four cylinders, each with a 120 cm$^3$ swept volume. The following parameters were kept constant:

Shaft speed = 850 rpm.
Temperature of heater tubes 42, $T_h = 800°$ C.
Temperature of cooler tubes 43, $T_c = 80°$ C.
Burner efficiency with intake air preheater, i.e. with by-pass 80 closed, $n_{br} = 0.85$
Burner efficiency without preheater, i.e. by-pass valve 80 open, $n_{br} = 0.5$
Generator 32 efficiency $n_{gen} = 0.92$
Engine working medium is Helium.

The energy efficiency is defined as the obtained electric energy divided by the extra energy (as fuel) needed above the amount of energy for producing the same quantity of hot water with a conventional boiler. Calculations were performed with an average cooling water temperature of 80° C. exiting from the coolers 16. With a mean working fluid pressure of p = 12 Mpa, the following results are produced:

Shaft power, $P_{sh} = 21.8$ kW.
Electric power, $P_e = 20.0$ kW
Heat input to heater tubes 42, $Q_e = 58.67$ kW$_{th}$
Heat rejected from Stirling engine cycle, $Q_c = 33.70$ kW$_{th}$
Engine friction losses, $Q_f = 3.17$ kW$_{th}$
Generator Losses, $Q_{gen} = 1.74$ kW$_{th}$ The total energy to the engine cooling water:

$$Q_{hwl} = Q_c + Q_f + Q_{gen}$$

$$Q_{hwl} = 33.70 + 3.17 + 1.74 = 38.6 \text{ kW}_{th}.$$

Further heat is supplied to the water from the combustion gases through the condensing heat exchanger. The total heat in fuel delivered to the system, $Q_{tot}$ = heat input in heater tubes, $Q_e$ divided by the burner efficiency, $n_{br}$. With the preheater:

$$Q_{tot} = \frac{58.57}{0.85} = 69.0 kW_{th}$$

The combustion gases will contain the fuel heat not delivered to the heater tubes, i.e. 15% of $Q_{tot}$ = 10.35 kW$_{th}$. Assuming the condensing heat exchanger has an efficiency of 85%, an additional 8.8 kW$_{th}$ is delivered to the hot water in the heat exchanger. The total heat to the water, $Q_{hwtot}$ is $Q_{hwl} + (0.85 \times Q_{tot})$ which is:

$$Q_{hwtot} = 38.6 + 8.8 = 47.4 \text{ kW}_{th}$$

This is more than sufficient to meet the building need of 42 kW$_{th}$.

To produce 47.4 kW$_{th}$ hot water with a conventional boiler having a 92% efficiency would require:

$$\frac{47.4}{0.92} kW_{th} \text{ in fuel or } 51.54 kW_{th}$$

With cogeneration, 17.46 kW$_{th}$ in fuel (69.0−51.54=17.46) was added to produce 20 kW electric. The comparison energy efficiency is:

$$\frac{P_e}{Q_{fuel}} \times 100 = \frac{20}{17.40} \times 100 = 114.5\%$$

When additional hot water is needed, preheater by-pass valve 82 is opened and the burner efficiency drops to 50%. To produce the same $Q_{hwl}$ of 38.6 kW$_{th}$ as before:

The total heat to the hot water is now:

$$Q_{tot} = \frac{58.68}{} = \frac{58.67}{} = 117.34 kW_{th}.$$

The heat added to the water in the condensing heat exchange is now:
$Q_{hw2} = 0.85 \times 0.5 \times 117.34$ kW$_{th}$ = 49.86 kW$_{th}$ The total heat to the hot water is now:

$$Q_{hwtot} = 38.6 + 49.86 = 88.5 \text{ kW}_{th}.$$

A gas boiler having the same capacity with an efficiency of 92% would require:

$$\frac{88.5}{0.92} = 96.16 kW_{th} \text{ in fuel.}$$

With cogeneration, an additional 21.18 kW$_{th}$ is used (117.34−96.16=21.18) to generate 20 kW electric resulting in a comparison efficiency of 94%.

Figure 4:
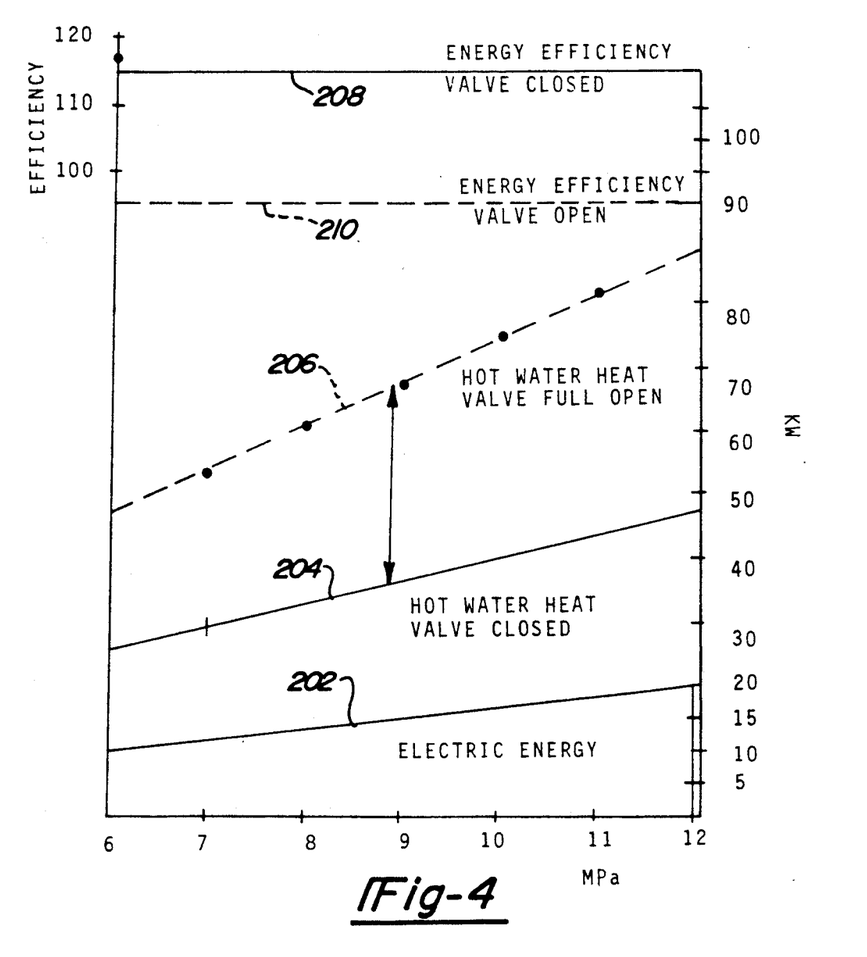
FIG. 4 is a graph showing electric energy production, hot water production and electric energy efficiency of the cogeneration system shown in FIG. 3.

FIG. 4 is a graph showing the electric energy, hot water heat and energy efficiency for various mean pressures of the engine working gas. The electric energy produced is shown by line 202. Electric energy output increases with increased mean pressure. Solid line 204 represents the thermal energy delivered to the hot water with by-pass valve 80 closed i.e. with the intake air being preheated. When extra hot water is needed, by-pass valve 80 is opened and the energy delivered to the hot water increases, as shown by broken line 206. Solid line 208 represents the efficiency of electric energy production with by-pass valve 80 closed while broken line 210 represents the electric energy production efficiency with valve 80 open. With the by-pass value open, the heat to the hot water is increased while the efficiency is decreased.

Figures 5, 6:
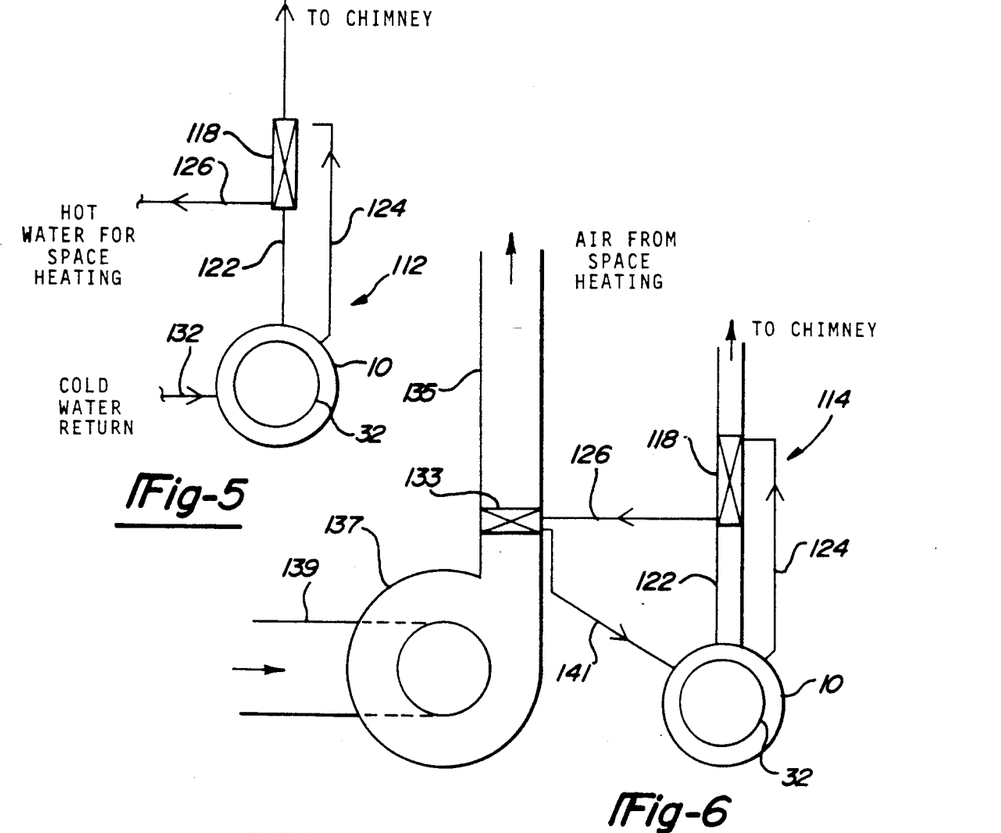
FIG. 5 is a schematic of a cogeneration system used for producing hot water for space heating.
FIG. 6 is a schematic of cogeneration system for use in providing forced air for space heating.

FIG. 5 illustrates a cogeneration system 112 which is similar to system 110. System 112 is used to produce hot water for space heating. System 112 eliminates water storage tank 128 and instead, directs the hot water from heat exchanger outlet pipe 126 to water fed radiators (not shown) for space heating. Cold water is returned from the radiators to engine 10 by cold water return pipe 132.

FIG. 6 illustrates cogeneration system 114 in which the hot water is used to heat air for forced air space heating. Outlet pipe 126 directs the hot water to a water to air heat exchanger 133. Heat exchanger 133 is disposed in an air outlet duct 135 from blower 137. Blower inlet duct 139 supplies fresh air and/or cold return air form the space being heated. Air from the blower passes through heat exchanger 133 to warm the air for space heating. The water, once cooled in heat exchanger 133, returns to engine 10 through pipe 141.

Figure 7:
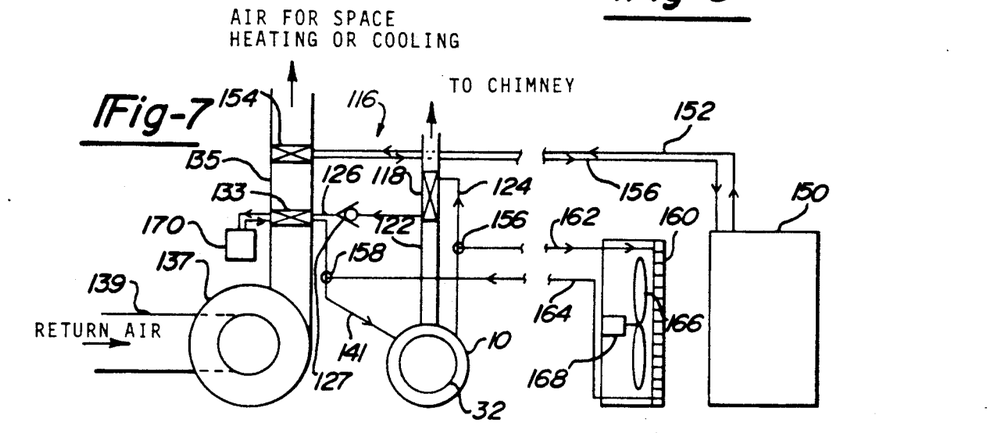
FIG. 7 is a modification of the cogeneration system of FIG. 6 in which an air conditioning system has been included.

System 114 can be modified as shown by cogeneration system 116 in FIG. 7 to include air conditioning for use during the summer. In system 116, during winter, when space heating is required, the system functions identically to cogeneration system 114 described with respect to FIG. 6. A one way check valve 172 is included in pipe 126 to ensure proper flow direction in the pipe. For air conditioning, an air conditioning compressor 150 is installed outside of the building in which the Stirling engine, generator and air blower are installed. A refrigerant, typically Freon, is conveyed from compressor 150 through conduit 152 to a refrigerant heat exchanger 154 in the blower outlet duct 135. The refrigerant is returned through conduit 156 to compressor 150. Heat exchanger 154 is thus used to cool air from blower 137 to provide cool air for air conditioning.

During air conditioning, space heating is not needed and waste heat must be removed from the engine and generator. Valve 156 in water pipe 124 is used to direct cooling water to radiator 160 located outside of the building through pipe 162. Return pipe 164 directs the water back to return pipe 141 through valve 158. Radiator 160 is used to remove heat from the engine coolant water and is cooled by a fan 166 driven by electric motor 168. Preferably, compressor 150 and motor 168 are powered by electricity produced by generator 32. Any excess electric energy is directed to the power grid and sold to the utility company. A coolant reservoir 170 is used to store coolant which has evaporated from condensing heat exchanger 118 by the combustion gases from Stirling engine 10.

During air conditioning, because the heat generated by engine 10 is waste heat, the system efficiency is not as great as when the cogeneration system is used for space heating. However, electricity demand peaks during summer due to the operation of air conditioners. The excess electricity produced by generator 32 can be efficiently utilized close to the site of its production.

Different strategies can be used for siting the cogeneration system to a building. One strategy is to operate the system at a constant power output selling excess electricity to the utility and using the heat as needed. Excess heat is dumped while cycling losses and partial load operating losses are low. Another strategy follows the electric load of the building with no sale back to the utility. The system is often operated at partial loads and considerable heat is dumped. A third strategy, which cogeneration systems for small buildings normally use, follows the thermal load of the building either for hot water or space heat or both. When used for space heating the system is controlled off the house thermostat like a conventional furnace. Excess electricity is sold back to the utility. The cogeneration system of this invention may be best used as a furnace to supply necessary space heating based on the building thermal needs. Other sizing strategies are also possible.

The cogeneration system of the present invention, utilizing a Stirling cycle engine, provides numerous advantages over the currently used large scale cogeneration systems employing reciprocating internal combustion engines. The Stirling engine when used in a small cogeneration system for use in small commercial or residential buildings has a much lower maintenance cost, a longer life, quieter operation and fewer emissions than a reciprocating internal combustion engine. This makes the Stirling engine much more attractive for use in a small cogeneration system.

In a cogeneration system, the Stirling engine is used to power an electric generator for production of electric energy. "Waste" heat from the engine and generator is used to provide hot water and/or space heating for the building, resulting in efficient use of fuel. In certain operating conditions, the amount of extra fuel used in a cogeneration system to produce both electricity and heat, as compared to the fuel required for producing an equivalent amount of heat, is less than the electric energy produced resulting in a comparison fuel efficiency of over 100% for the production of electricity. Cogeneration is further advantageous in that the electric energy may be used close to the point of production such that the transmission line losses are reduced, resulting in less electric energy being produced and thereby less fuel consumed. Furthermore, the fuel most often burned in small commercial and residential buildings is natural gas which produces less $CO_2$ then a coal fired electric generating plant.

It is to be understood that the invention is not limited to the exact construction illustrated and described above, but that various changes and modifications may be made without departing from the spirit and scope of the invention as defined in the following claims.

What is claimed is:

1. A cogeneration system for producing process heat for useful purposes and electric energy, comprising:
   an electric generator;
   a Stirling cycle engine having an output shaft operatively coupled to said generator for driving said generator, said engine including at least one internal fuel combustor;
   means for circulating a cooling liquid about said generator and engine to extract heat therefrom;
   an exhaust system coupled with said engine for exhausting combustion gases from said engine, said exhaust system including a condensing heat exchanger for cooling said combustion gases below the condensing temperature of the water vapor in the exhaust gases;
   means for directing said cooling liquid around said condensing heat exchanger to extract heat therefrom and heat said liquid; and
   means for directing said cooling liquid for useful purposes.

2. The cogeneration system of claim 1 wherein said engine includes a housing and said electric generator is disposed within said housing.

3. The cogeneration system of claim 1 wherein said engine includes a counterflow heat exchanger through which said exhaust gases flow between said fuel combustors and said condensing heat exchanger and through which incoming combustion air flows so as to preheat said incoming combustion air.

4. The cogeneration system of claim 3 wherein said engine exhaust system includes means for bypassing said counterflow heat exchanger to direct said combustion gases from said combustors directly to said condensing heat exchanger; and
   wherein said bypass means includes valve means for regulating the flow of combustion gases through said bypass means.

5. The cogeneration system of claim 1 wherein said generator is operated as a motor to rotate the output shaft of said engine during starting of said engine.

6. The cogeneration system of claim 1 wherein said engine further comprises a plurality of cylinders each containing a piston and a working fluid for said Stirling cycle engine; and
   means selectively operable for providing fluid communication between said cylinders so that movement of said pistons in said cylinders does not cause compression of said working fluid whereby the torque required to rotate said output shaft during engine starting is reduced.

7. The cogeneration system of claim 1 wherein said cooling liquid is water.

8. The cogeneration system of claim 7 wherein said means for directing said cooling liquid includes a storage tank for storing said water for later use as hot water.

9. The cogeneration system of claim 1 wherein said means for directing said cooling liquid includes closed loop means for conveying said liquid to a space for heating said space and returning said liquid to said engine.

10. The cogeneration system of claim 1 further comprising:
    blower means for forcing air to a space to be heated and for drawing cool air from said space; and
    said liquid directing means including a liquid to air heat exchanger around which said blower forces said air to extract heat from said liquid to heat said air.

11. The cogeneration system of claim 1 further comprising:
    blower means for forcing air to a space to be heated and for drawing cool air from said space; and
    said liquid directing means including a liquid air heat exchanger around which said blower forces said air to extract heat from said liquid to heat said air;
    said cooling liquid directing means further including valve means for selectively directing said liquid to radiator means for rejecting heat from said system rather than directing said liquid to said heat exchanger; and
    means for cooling said air forced from said blower means.

12. The cogeneration system of claim 11 wherein said cooling means includes a compressor for a refrigerant, a cooling heat exchanger disposed in the flow of air forced from said blower means, and means for circulating said refrigerant from said compressor to said cooling heat exchanger and returning said refrigerant to said compressor so as to cool said air forced from said blower is cooled by said refrigerant.

13. The cogeneration system of claim 1 further comprising means for using said cooling liquid for space heating.

14. The cogeneration system of claim 1 wherein said cooling liquid is water and said water is used as hot water.

15. The cogeneration system of claim 1 wherein said cooling liquid, when exiting said engine, has a mean temperature of approximately 80° C.

16. A cogeneration system for producing process heat for useful purpose and electric energy, comprising:
- an electric generator;
- a Stirling cycle engine having an output shaft operatively coupled to said generator for driving said generator, said engine including at least one heat transfer stack including a cooler, a regenerator and a heat exchanger, and a fuel combustor for heating said heat exchanger, a working gas within said heat transfer stack, means for displacing said gas between said heat exchanger and cooler through said regenerator and means for cooling said cooler to maintain a temperature differential between said cooler and heat exchanger for operation of said Stirling engine;
- means for circulating a cooling liquid about said generator and engine to extract heat therefrom;
- an exhaust system coupled with said engine for exhausting combustion gases from said engine, said exhaust system including a condensing heat exchanger for cooling said combustion gases below the condensing temperature of the water vapor in the exhaust gases;
- mean for directing said cooling liquid around said condensing heat exchanger to extract heat therefrom and heat said liquid; and
- means for directing said heated cooling liquid for useful purposes.

* * * * *

UNITED STATES PATENT AND TRADEMARK OFFICE
CERTIFICATE OF CORRECTION

PATENT NO. : 5,074,114
DATED : December 24, 1991
INVENTOR(S) : Roelf J. Meijer, Ernst J. Meijer, Ted M. Godett It is certified that error appears in the above-identified patent and that said Letters Patent is hereby corrected as shown below:

On the title page, item [54] and in column 1, line 2, in the title "CONGENERATION" should read --COGENERATION--.

Column 6, Line 41, "850" should read --1850--.

Column 7, Line 43, "$Q_{tot} = \frac{58.68}{} = \frac{58.67}{} = 117.34 kW_{th}$" should read as follows:
$$-- Q_{tot} = \frac{58.67}{n_{br}} = \frac{58.67}{.05} = 117.34 kW_{th} --.$$

Column 9, Line 59-60, Claim 1, delete "internal".

Column 9, Line 67, Claim 1, delete "," after "condensing".

Column 12, Line 18, Claim 16, "mean" should read --means--.

Signed and Sealed this

Sixth Day of July, 1993

Attest:

MICHAEL K. KIRK

*Attesting Officer*    *Acting Commissioner of Patents and Trademarks*